(12) United States Patent
Otake et al.

(10) Patent No.: US 9,714,034 B2
(45) Date of Patent: Jul. 25, 2017

(54) VEHICLE CONTROL DEVICE

(71) Applicant: TOYOTA JIDOSHA KABUSHIKI KAISHA, Toyota-shi, Aichi-ken (JP)

(72) Inventors: Hirotada Otake, Susono (JP); Tsuyoshi Shimizu, Susono (JP); Hirohito Ide, Susono (JP); Akihisa Yokoyama, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 10 days.

(21) Appl. No.: 15/040,074

(22) Filed: Feb. 10, 2016

(65) Prior Publication Data

US 2016/0272203 A1   Sep. 22, 2016

(30) Foreign Application Priority Data

Mar. 18, 2015  (JP) .................. 2015-054376

(51) Int. Cl.
| | |
|---|---|
| *B60W 30/12* | (2006.01) |
| *G08G 1/16* | (2006.01) |
| *B60T 8/1755* | (2006.01) |
| *B60W 50/14* | (2012.01) |
| *B60W 30/18* | (2012.01) |
| *G06K 9/00* | (2006.01) |

(52) U.S. Cl.
CPC ......... *B60W 30/12* (2013.01); *B60T 8/17557* (2013.01); *B60W 30/18145* (2013.01); *B60W 30/18154* (2013.01); *B60W 50/14* (2013.01); *G06K 9/00798* (2013.01); *G08G 1/167* (2013.01); *B60W 2420/42* (2013.01); *B60W 2550/141* (2013.01)

(58) Field of Classification Search
None
See application file for complete search history.

(56) References Cited

U.S. PATENT DOCUMENTS

| | | | |
|---|---|---|---|
| 8,200,424 B2 * | 6/2012 | Mitsugi | G01C 21/20 340/990 |
| 9,120,486 B1 * | 9/2015 | Mallinger | B60W 30/12 |
| 2005/0209748 A1 * | 9/2005 | Watanabe | G06K 9/00798 701/23 |
| 2005/0270374 A1 * | 12/2005 | Nishida | G05D 1/0246 348/148 |

(Continued)

FOREIGN PATENT DOCUMENTS

| | | |
|---|---|---|
| JP | 2007-164636 A | 6/2007 |
| JP | 5124875 B2 | 1/2013 |

*Primary Examiner* — Rami Khatib
*Assistant Examiner* — Jeffrey Boomer
(74) *Attorney, Agent, or Firm* — Sughrue Mion, PLLC (57) ABSTRACT

In a case where existence of a branch point in front of a vehicle is not recognized based on position information of the vehicle and map information, when a lane width variation is greater than or equal to a first threshold value larger than a second threshold value, a determination that the branch point exists is made by a determination unit of a vehicle control device. On the other hand, in a case where existence of the branch point is recognized based on the position information of the vehicle and the map information, when the lane width variation is greater than or equal to the second threshold value smaller than the first threshold value, a determination that the branch point exists is made by the determination unit.

2 Claims, 5 Drawing Sheets

(56) References Cited

U.S. PATENT DOCUMENTS

| | | | |
|---|---|---|---|
| 2007/0021912 A1* | 1/2007 | Morita | G01C 21/12 701/431 |
| 2008/0208460 A1* | 8/2008 | Nakao | G01C 21/3658 701/532 |
| 2009/0138193 A1* | 5/2009 | Katou | G01C 21/3658 701/533 |
| 2009/0143974 A1* | 6/2009 | Adachi | G01C 21/3658 701/532 |
| 2009/0174577 A1* | 7/2009 | Nakamura | G06K 9/00798 340/995.1 |
| 2010/0231718 A1* | 9/2010 | Nakamori | G06K 9/00798 348/148 |
| 2010/0246889 A1* | 9/2010 | Nara | G06K 9/00798 382/104 |
| 2011/0010021 A1 | 1/2011 | Kobayashi | |
| 2013/0080047 A1* | 3/2013 | Kobayashi | G06K 9/00805 701/409 |
| 2014/0229068 A1* | 8/2014 | Ueyama | B62D 15/0255 701/41 |
| 2015/0307130 A1* | 10/2015 | Kimura | B60W 30/10 701/41 |
| 2015/0348275 A1* | 12/2015 | Kumano | G06T 7/12 382/199 |
| 2016/0327947 A1* | 11/2016 | Ishikawa | B60W 50/08 |
| 2017/0021765 A1* | 1/2017 | Mori | B60Q 9/00 |
| 2017/0057543 A1* | 3/2017 | Sakaguchi | B62D 15/026 |
| 2017/0066445 A1* | 3/2017 | Habu | B60W 30/165 |
| 2017/0091564 A1* | 3/2017 | Kawasaki | G06K 9/00798 |

* cited by examiner

VEHICLE CONTROL DEVICE

TECHNICAL FIELD

Various aspects of the present invention relate to a vehicle control device.

BACKGROUND as described in Japanese Patent No. 5124875, a vehicle control device is known in the related art, which recognizes two lane lines that define a driving lane of a vehicle, based on a captured image in front of the vehicle, and performs lane keeping control such that the vehicle travels along the driving lane that is defined by the lane lines.

A vehicle control device of Japanese Patent No. 5124875 determines whether or not a branch point from a driving lane exists in front of a vehicle, based on the amount of change or the like of the distance between two lane lines recognized based on a captured image. When it is determined that the branch point exists in front of the vehicle, the vehicle control device of Japanese Patent No. 5124875 performs lane keeping control with the lane line on one side of the two lane lines as a reference.

SUMMARY

Incidentally, in the related art described above, when the amount of change in the distance between the two lane lines recognized based on the captured image is greater than or equal to a predetermined threshold value, for example, it is determined that a branch point from the driving lane exists in front of the vehicle. When the threshold value is a small value, it can be erroneously determined that a branch point exists due to a small variation in the distance between the two lane even though a branch point, does not exist in reality.

On the other hand, when the threshold value is a large value, it is not determined that a branch point exists in front of the vehicle, until the distance between the two lane lines is greatly widened. In this case, for example, the vehicle travels to be spaced by an equal distance from both of the two lane lines greatly spaced apart, and the vehicle travels with the lane line on one side of the two lane lines as a reference, after the existence of the branch point is determined. For this reason, there are oases of the behavior of the vehicle becoming unstable, such as when it wobbles. Therefore, improvement is desired.

An object of the present invention is therefore to provide a vehicle control device that improves the accuracy of determinations of whether or not a branch point from a driving lane exists in front of a vehicle, thus reducing the unstable behavior from the vehicle.

According to an aspect of the present invention, there is provided a vehicle control device including: a determination unit configured to recognize two lane lines which define a driving lane of a vehicle, based on a captured image of in front of the vehicle, and determine whether or not a branch point from the driving lane exists in front of the vehicle, based on a lane width variation which is the amount of change of a distance between, the two lane lines; and a lane keeping control unit configured to perform lane keeping control such that the vehicle travels along the driving lane, based on a result determined by the determination unit, wherein the determination unit is configured to, in a case where existence of the branch point in front of the vehicle is not recognized based on position information of the vehicle and map information, determine that the branch point exists, when the lane width variation is greater than or equal to a first threshold value, and, in a case where existence of the branch point in front of the vehicle is recognized based on the position information of the vehicle and the map information, determine that the branch point exists, when the lane width variation is greater than or equal to a second threshold value smaller than the first threshold value.

According to this configuration, in a case where the existence of the branch point is not recognized based on the position information of the vehicle and the map information, when the lane width variation is greater than or equal to the first threshold value larger than the second threshold value, a determination that the branch point exists is made by the determination unit. Therefore, it is possible to prevent the existence of the branch point from being erroneously determined due to a small variation in the distance between the two lane lines though the possibility that the branch point may exist in reality is low. On the other hand, in a case where the existence of the branch point is recognized based on the position information of the vehicle and the map information, when the lane width variation is greater than or equal to the second threshold value smaller than the first threshold value, a determination that the branch point exists is made by the determination unit, Therefore, in a case where the possibility that the branch point may exist is high, a determination that the branch point exists in front of the vehicle is made earlier, and therefore, it is possible to prevent the behavior of the vehicle from becoming unstable, such as the vehicle wobbling. From the above, it is possible to improve the accuracy of a determination of whether or not the branch point from the driving lane exists in front of the vehicle, and thus reduce the behavior of the vehicle becoming unstable.

In this case, the determination unit may be configured to acquire a lane width reference value which is a reference value of the distance between the two lane lines, based on the position information of the vehicle and the map information, and calculate the lane width variation, based on the amount of change of the distance between the two lane lines recognized based on the captured image of in front of the vehicle with respect to the lane width reference value.

According to this configuration, by the determination unit, the lane width reference value which is a reference value of the distance between the two lane lines is acquired based on the position information of the vehicle and the map information and the lane width variation is calculated based on the amount of change of the distance between the two lane lines recognized based on the captured image with respect to the lane width reference value, and therefore, it is possible to reduce the influence of an error or the like of the recognition of the lane lines in the captured image, and thus it is possible to improve the accuracy of the calculation of the lane width variation.

According to the present invention, it is possible to improve the accuracy of a determination of whether or not a branch point from a driving lane exists in front of a vehicle, and thus reduce the behavior of the vehicle becoming unstable.

DETAILED DESCRIPTION

Figure 1:
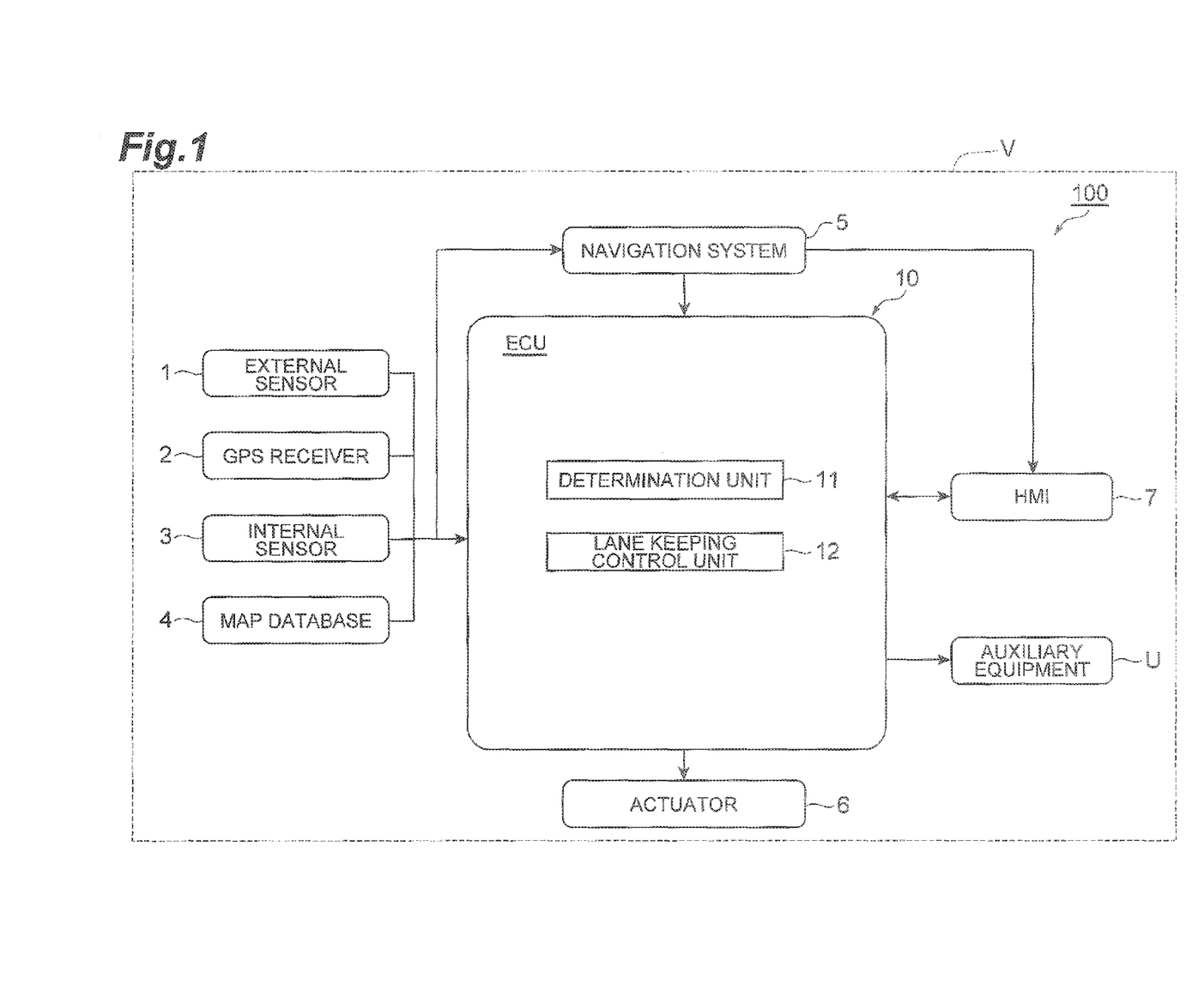
FIG. 1 is a block diagram showing the configuration of a vehicle control device according to an embodiment.

Hereinafter, an embodiment of the present invention will be described in detail using the drawings. As shown in FIG. 1, a vehicle control device 100 is mounted on a vehicle V such as a passenger car. The vehicle control device 100 recognizes two lane lines which define a driving lane of the vehicle V, based on a captured image of in front of the vehicle V, and performs lane keeping control such that the vehicle V travels along the driving lane which is defined by the lane lines.

As shown in FIG. 1, the vehicle control device 100 is provided with an external sensor 1, a GPS (Global Positioning System) receiver 2, an internal sensor 3, a map database 4, a navigation system 5, an actuator 6, an HMI (Human Machine interface) 7, auxiliary equipment U, and an ECU 10.

The external sensor 1 is detection equipment which detects an external situation that is information on the surroundings of the vehicle V. The external sensor 1 includes a camera. Further, the external sensor 1 may include either of a radar and a LIDAR (Laser Imaging Detection and Ranging).

The camera is imaging equipment ent which images an external situation of the vehicle V. The camera is provided on, for example, the back side of a front windshield of the vehicle V. In the following description, the camera will be described focusing on a case of it being a monocular camera. However, the camera may be a stereo camera. A stereo camera has two imaging units disposed so as to reproduce, for example, a binocular parallax. Information in a depth direction is also included in the imaging information of the stereo camera. The camera outputs imaging information about the external situation of the vehicle V to the ECU 10. Further, the camera may be not only a visible light camera, but also an infrared camera.

The radar detects an object outside of the vehicle V by using radio waves. The radio waves are, for example, millimeter waves. The radar transmits radio waves to the surroundings of the vehicle V and receives the radio waves reflected by an object, thereby detecting the object. The radar can output, for example, a distance or a direction to the object as object information about the object. The radar outputs the detected object information to the ECU 10. In addition, in a case of performing sensor fusion in a subsequent stage, the radar may output receiving information of the reflected radio waves to the ECU 10.

The LIDER detects an object outside of the vehicle V by using light. The LIDER sends light to the surroundings of the vehicle V and receives the light reflected by an object, thereby measuring a distance to a reflection point and detecting the object. The LIDER can output, for example, a distance or a direction to the object as object information. The LIDER outputs the detected object information to the ECU 10. In addition, in a case of performing sensor fusion in a subsequent stage, the LIDER may output receiving information of the reflected light to the ECU 10. In addition, the camera, the radar, and the LIDER need not necessarily be provided overlappingly.

The GPS receiver 2 receives signals from three or more GPS satellites, thereby acquiring position information indicating the position of the vehicle V. For example, a latitude and longitude are included in the position information. The GPS receiver 2 outputs information on the measured position of the vehicle V to the ECU 10. In addition, instead of the GPS receiver 2, other means capable of identifying the latitude and longitude at which the vehicle V is present may be used.

The internal sensor 3 is a detector which detects information corresponding to a traveling state of the vehicle V. The internal sensor 3 includes a vehicle speed sensor in order to detect information corresponding to the traveling state of the vehicle V. The internal sensor 3 may include an acceleration sensor and a yaw rate sensor.

The vehicle speed sensor is a detector which detects the speed of the vehicle V. As the vehicle speed sensor, for example, a wheel speed sensor which is provided at a wheel of the vehicle V or a drive shaft or the like which rotates integrally with the wheels, and detects the rotational speed of the wheels, may be used. The vehicle speed sensor outputs vehicle speed information (wheel speed information) which includes the speed of the vehicle V to the ECU 10.

The acceleration sensor is a detector which detects the acceleration of the vehicle V. The acceleration sensor includes, for example, a forward and backward acceleration sensor which detects the acceleration in a front-back direction of the vehicle V, and a lateral acceleration sensor which detects the lateral acceleration of the vehicle V. The acceleration sensor outputs acceleration information which includes the acceleration of the vehicle V to the ECU 10.

The yaw rate sensor is a detector which detects a yaw rate (rotational angular velocity) around a vertical axis of the center of gravity of the vehicle V. As the yaw rate sensor, for example, a gyro sensor can be used. The yaw rate sensor outputs yaw rate information which includes the yaw rate of the vehicle V to the ECU 10.

The map database 4 is a database provided with map information. The map database 4 is formed in, for example, a HDD (Hard disk drive) mounted on the vehicle V. For example, position information of a road, information about a road shape, and position information of an intersection and a branch point are included in the map information. For example, the types of a curve and a straight portion, the curvature of a curve, and the like are included in the information about a road shape. Further, in a case where the vehicle control device 100 uses position information of a shielding structure such as a building or a wall, or a SLAM (Simultaneous Localization and Mapping) technique, an output signal of the external sensor 1 may be included in the map information. In addition, the map database 4 may be stored in a computer of a facility such as an information processing center capable of communicating with the vehicle V.

The navigation system 5 is a device which performs guidance to a destination set on a map by a driver of the vehicle V for the driver of the vehicle V. The navigation system 5 calculates a route on which the vehicle V travels, based on the position information of the vehicle V measured by the GPS receiver 2 and the map information of the map database 4. The route may be, for example, a route in which a driving lane on which the vehicle V travels is specified in sections of a plurality of lanes. The navigation system 5 calculates, for example, a target route from the position of the vehicle V to a destination and performs the notification of the target route to a driver by display of a display and an audio output of a speaker. The navigation system 5 outputs, for example, information about the target route of the vehicle V to the ECU 10. In addition, the navigation system 5 may use information stored in a computer of a facility such as an information processing center capable of communicating with the vehicle V. Alternatively, some of processing which is performed by the navigation system 5 may be performed by the computer of the facility.

The actuator 6 is a device which executes the vehicle control of the vehicle V. The actuator 6 includes at least a throttle actuator, a brake actuator, and a steering actuator. The throttle actuator controls the amount of air supplied to an engine (the degree of throttle opening) according to a control signal from the ECU 10, thereby controlling the drive force of the vehicle V. In addition, in a case where the vehicle V is a hybrid car or an electric automobile, the throttle actuator is not included, and a control signal from the ECU 10 is input to a motor as a power source, whereby the drive force is controlled.

The brake actuator controls a brake system according to a control signal from the ECU 10, thereby controlling a braking force which is applied to the wheels of the vehicle V. As the brake system, for example, a hydraulic brake system can be used. The steering actuator controls the driving of an assist motor which controls a steering torque of an electric power steering system, according to a control signal from the ECU 10. In this way, the steering actuator controls the steering torque of the vehicle V.

The HMI 7 is an interface for performing the output and the input of information between an occupant (including a driver) of the vehicle V and the vehicle control device 100. The HMI 7 is provided with, for example, a display panel for displaying image information to the occupant, a speaker for an audio output, operation buttons or a touch panel for allowing the occupant to perform an input operation, and the like. The HMI 7 may perform the output of information to the occupant by using a portable information terminal wirelessly connected thereto and may accept an operation input by the occupant by using the portable information terminal.

The auxiliary equipment U is equipment which normally can be operated by a driver of the vehicle V. The auxiliary equipment U is a general term for equipment which is not included in the actuator 6. The auxiliary equipment U here includes, for example, direction indicator lamps, headlights, a wiper, and the like.

The ECU 10 controls automatic driving of vehicle V. The ECU 10 is an electronic control unit having a CPU (Central Processing Unit), a ROM (Read Only Memory), a RAM (Random Access Memory), and the like. The ECU 10 has a determination unit 11 and a lane keeping control unit 12. In the ECU 10, the control of each unit such as the determination unit 11 described above is executed by loading a program stored in the ROM into the RAM and executing the program in the CPU. The ECU 10 may be composed of a plurality of electronic control units.

The determination unit 11 recognizes two lane lines which define a driving lane of the vehicle V, based on an image in front of the vehicle V captured by the camera of the external sensor 1, and determines whether or not a branch point from the driving lane exists in front of the vehicle V, based on a lane width variation which is the amount of change of the distance between the two lane lines. The determination unit 11 may perform a determination of whether or not a branch point from the driving lane exists in front of the vehicle V, by using information output from an external sensor 1 other than the camera, the GPS receiver 2, the internal sensor 3, and the map database 4, in addition to the camera of the external sensor 1, as will be described later.

The lane keeping control unit 12 performs lane keeping control along the driving lane, based on the result determined by the determination unit 11, as will be described later. The lane keeping control unit 12 performs the lane keeping control, based on information output from the external sensor 1, the GPS receiver 2, the internal sensor 3, the map database 4, and the navigation system 5, in addition to the result determined by the determination unit 11.

Figure 2:
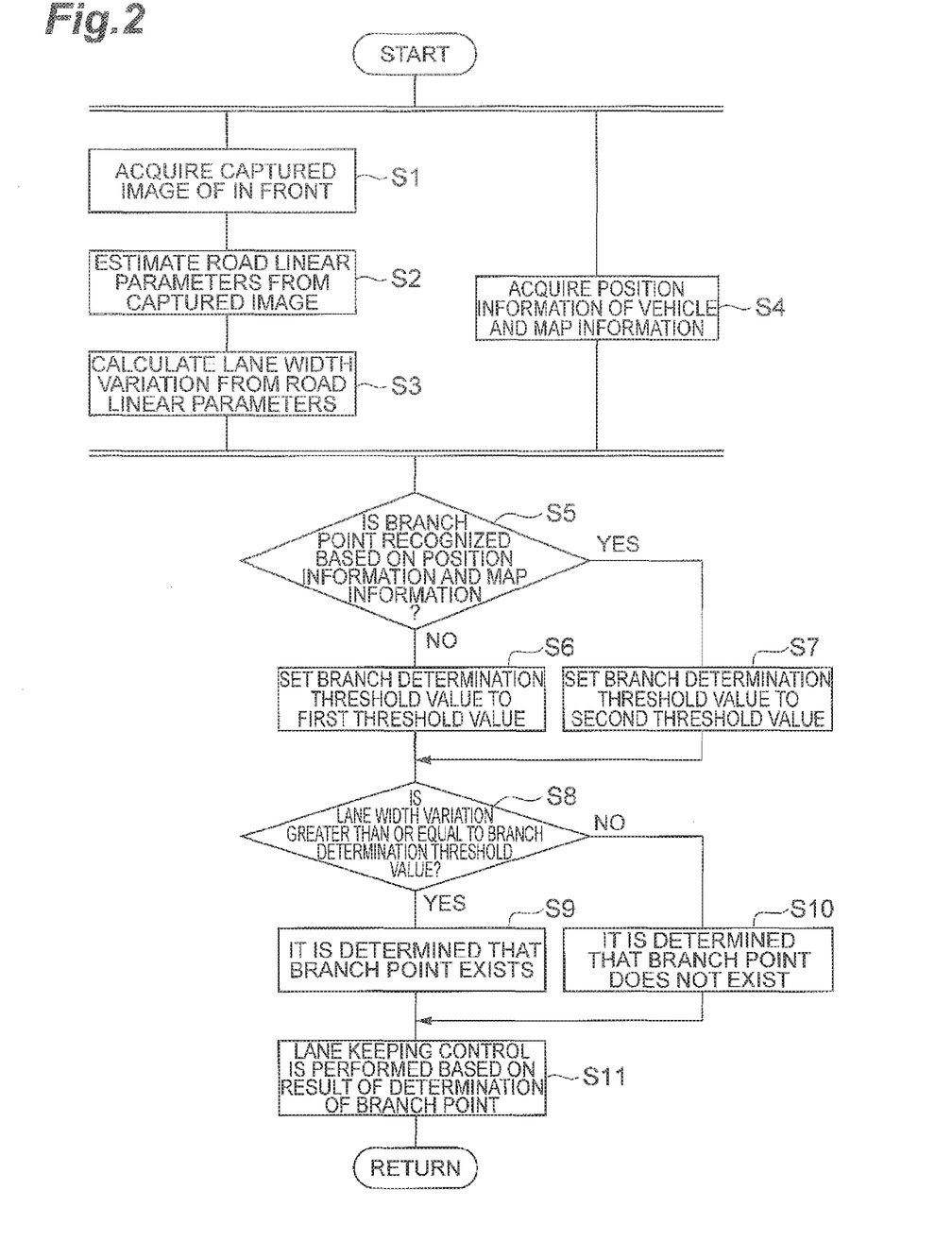
FIG. 2 is a flowchart showing an operation of the vehicle control device of FIG. 1.

Next, processing which is executed in the vehicle control device 100 will be described. As shown in FIG. 2, the determination unit 11 of the ECU 10 acquires a captured image of in front (S1). The determination unit 11 estimates road linear parameters from the captured image (S2). The determination unit 11 calculates a lane width variation from the road linear parameters (S3). Hereinafter, the processing of S1 to S3 will be described in detail.

Figure 3:
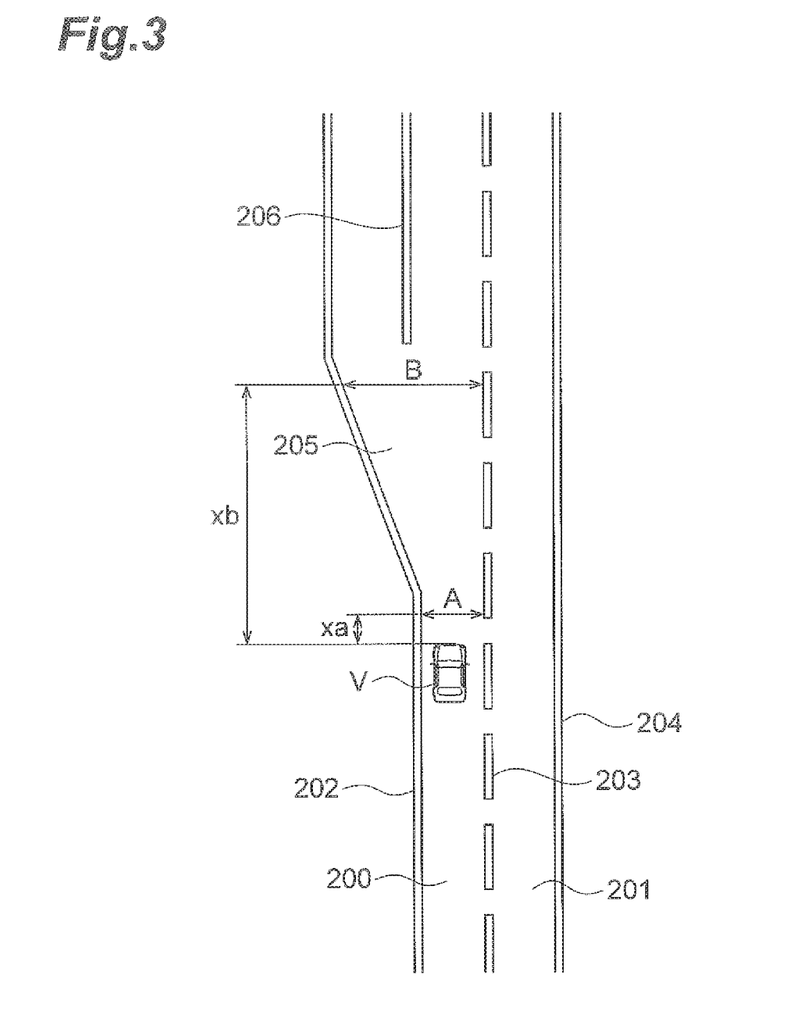
FIG. 3 is a plan view showing a situation at a branch point.

In addition, in the following description, a situation in which the vehicle V travels on a driving lane 200 as shown in FIG. 3 is assumed. Another driving lane 201 is adjacent to the right side of the driving lane 200. The driving lane 200 is defined by two lane lines 202 and 203, and the driving lane 201 is defined by two lane lines 203 and 204. The driving lane 200 and the driving lane 201 are partitioned by the lane line 203. A branch point 205 exists in front of the vehicle V. In the vicinity of the branch point 205, the distance between the two lane lines 202 and 203 which define the driving lane 200 extends from a distance A to a distance B larger than the distance A. At a position past the branch point 205, the driving lane 200 is defined by a new lane line 206 and the lane line 203.

Figure 4A:
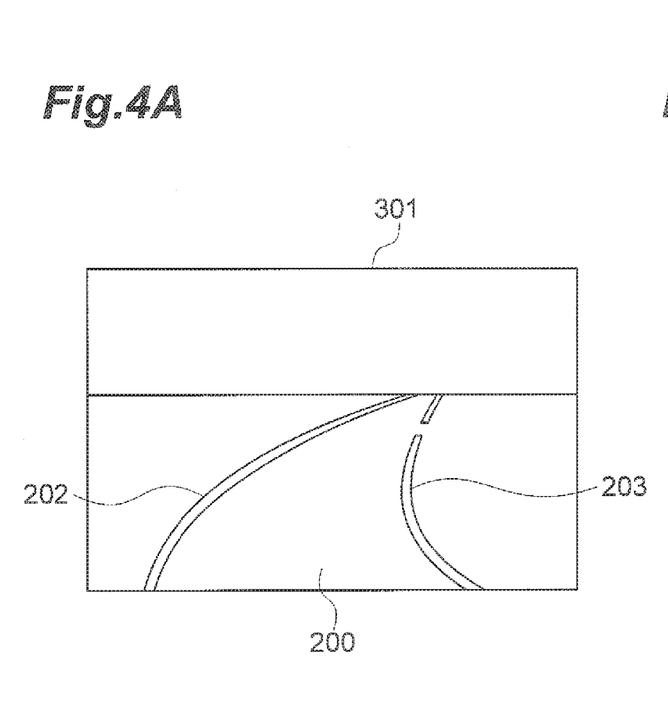
FIG. 4A is a captured image of in front of a vehicle.
Figure 4B:
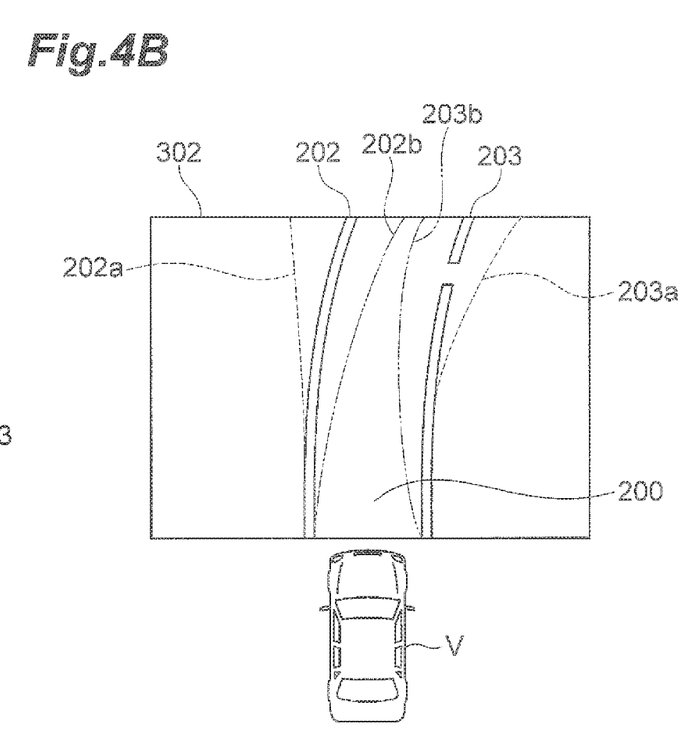
FIG. 4B is an image obtained by performing viewpoint conversion to a plan view on the captured image of FIG. 4A.

As shown in FIG. 4A, the two lane lines 202 and 203 which define the driving lane 200 are reflected in a captured image 301 which the determination unit 11 acquires from the camera of the external sensor 1. The determination unit 11 converts the captured image 301 of FIG. 4A into an overhead image 302 as shown in FIG. 4B, by known viewpoint conversion. The optical axis of the camera of the external sensor 1 has an angle of dip with respect to the road surface of the driving lane 200. The angle of dip varies according to a situation or the like of the road surface of the driving lane 200.

In a case of converting the captured image 301 into the overhead, image 302 assuming that the angle of dip of the camera is more upward than an actual angle of dip, like lane lines 202a and 203a of FIG. 4B, the two lane lines 202a and 203a are reflected in the overhead image 302 as if the distance between the two lane lines 202a and 203a is widened. On the other hand, in a case of converting the captured image 301 into the overhead image 302 assuming that the angle of dip of the camera is more downward than an actual angle of dip, like lane lines 202b and 203b of FIG. 4B, the two lane lines 202b and 203b are reflected in the overhead image 302 as if the distance between the two lane lines 202b and 203b is narrowed. Therefore, the determination unit 11 estimates the angle of dip of the camera, at which the two lane lines 202 and 203 are reflected in the overhead image 302 so as to become parallel to each other, like the lane lines 202 and 203 of FIG. 4B, on the premise that the two lane lines 202 and 203 are parallel, and converts the captured image 301 into the overhead image 302, based on this angle of dip.

Figure 5:
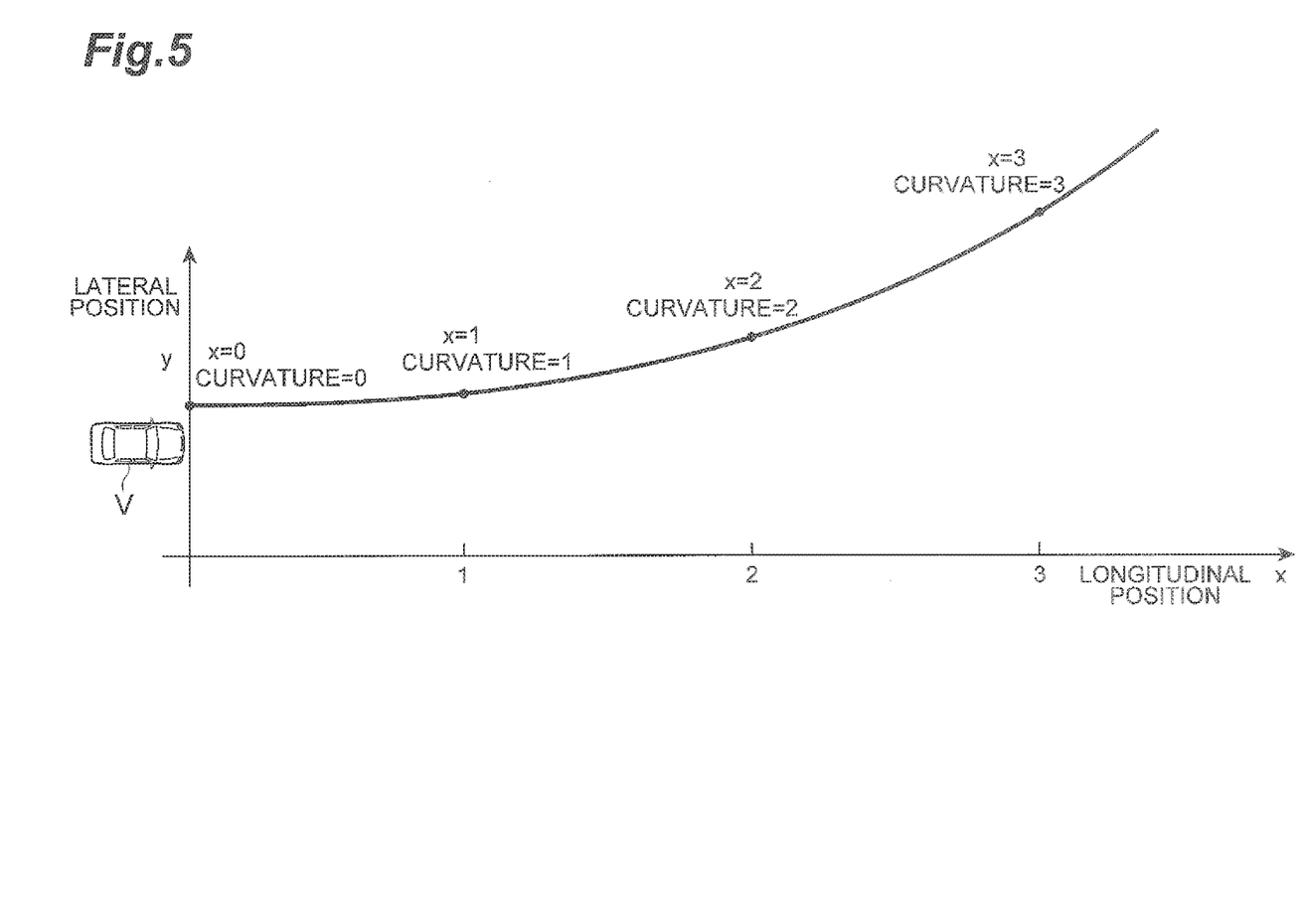
FIG. 5 is a graph showing a clothoid curve.

In general, the lane lines 202 and 203 of the driving lane 200 have the shape of a clothoid curve in which curvature changes in proportion to a distance forward from the vehicle V, as shown in FIG. 5. In FIG. 5, a longitudinal position x is a distance in front of the vehicle V and a lateral position y is a distance to the side of the vehicle V. Therefore, the determination unit 11 determines the road linear parameters by clothoid fitting. The clothoid curve as shown in FIG. 5 can be approximated by Expression (1) shown below. The determination unit 11 approximates each of the two lane lines 202 and 203 of the overhead image 302 of FIG. 4B by Expression (1), thereby estimating the road linear parameters which include the rate of change of curvature, the curvature, the yaw angle, and the initial lateral position of each of the two lane lines 202 and 203.

$$\text{Lateral position } y=(1/6)\times\text{rate of change of curvature}\times x^3+(1/2)\times\text{curvature}\times x^2+\text{yaw angle}\times x+\text{initial lateral position} \quad (1)$$

The road linear parameters of Expression (1) are estimated, whereby the determination unit 11 can calculate the lateral position y with respect to an arbitrary longitudinal position x of each of the two lane lines 202 and 203. In this way, the determination unit 11 can calculate the distance between the two lane lines 202 and 203 at an arbitrary longitudinal position x in front of the vehicle V.

The determination unit 11 can calculate, for example, a difference between the distance A between the lane lines 202 and 203 at an arbitrary longitudinal position $x_a$ in front of the vehicle V and the distance B between the lane lines 202 and 203 at an arbitrary longitudinal position $x_b$ in front of the vehicle V, as the lane width variation, as shown in FIG. 3. The longitudinal position $x_a$ can be set to be, for example, the position of the minimum distance from the vehicle V, which can be imaged by the camera of the external sensor 1. The longitudinal position $x_b$ can be set to be the position of a distance in which it is desirable to determine whether or not the branch point 205 exists in front of the vehicle V, in advance, for the lane keeping control. The longitudinal position $x_b$ can be set at, for example, a position which is in an imaging range of the camera of the external sensor 1 and for which a distance from the vehicle V increases as the vehicle speed of the vehicle V detected by the vehicle speed sensor of the internal sensor 3 becomes larger.

In addition, in this embodiment, the determination unit 11 may acquire a lane width reference value which is a reference value of the distance between the two lane lines 202 and 203, as the distance A between the lane lines 202 and 203 at the longitudinal position $x_a$, based on the position information acquired by the UPS receiver 2 of the vehicle V and the map information of the map database 4, and calculate the lane width variation, based on the amount of change of the distance B at the longitudinal position $x_b$ between the two lane lines recognized based on the captured image 301 of in front of the vehicle V with respect to the lane width reference value (the distance A).

As shown in FIG. 2, the determination unit 11 acquires, in parallel to the processing of S1 to S3, the position information of the vehicle V and the map information (S4). The determination unit 11 determines whether or not the existence of the branch point 205 in front of the vehicle V can be recognized, based on the position information of the vehicle V and the map information (S5). The determination of whether or not the existence of the branch point 205 in front of the vehicle V can be recognized can be performed by for example, whether or not information indicating the existence of the branch point 205 is included in the map information within a range of an arbitrary distance in front of the vehicle V.

In a case where the existence of the branch point 205 in front of the vehicle V is not recognized (S5), the determination unit 11 sets a branch determination threshold value to a first threshold value (S6). The branch determination threshold value is a threshold value of the lane width variation for determining the existence of the branch point 205 in front of the vehicle V. In a case where the existence of the branch point 205 in front of the vehicle V is recognized (S5), the determination unit 11 sets the branch determination threshold value to a second threshold value smaller than the first threshold value (S7).

In a case where the lane width variation is greater than or equal to the set branch determination threshold value (S8), the determination unit 11 determines that the branch point 205 exists (S9). On the other hand, in a case where the lane width variation is less than the set branch determination threshold value (S8), the determination unit 11 determines that the branch point 205 does not exist (S10).

The lane keeping control unit 12 of the ECU 10 outputs a control signal to the actuator 6, based on the result determined by the determination unit 11, and performs the lane keeping control along the driving lane 200 (S11). In a case where a determination that the branch point 205 from the driving lane 200 exists in front of the vehicle V is made by the determination unit 11, the lane keeping control unit 12 performs the lane keeping control such that a traveling direction of the vehicle V is maintained. In this case, the lane keeping control unit 12 performs the lane keeping control such that the vehicle V travels along a side where a rate of change of curvature, curvature, or variation in the lateral position with respect to the longitudinal position x is small in any one of the two lane lines 202 and 203, for example.

Further, in a case where a determination that the branch point 205 exists is made by the determination unit 11, the lane keeping control unit 12 may reduce a control gain of the lane keeping control and thus moderate the behavior of the vehicle V with respect to a change in the lane lines 202 and 203. Further, in a case where a determination that the branch point. 205 exists is made by the determination unit 11, the lane keeping control unit 12 may stop the lane keeping control.

Further, in a case where a determination that the branch point 205 exists is made by the determination unit 11, the lane keeping control unit 12 may inform a driver of the vehicle V of the existence of the branch point 205 through the HMI 7. Further, in a case where a determination that the branch point 205 exists is made by the determination unit 11, the lane keeping control unit 12 may inform a driver of the vehicle V that the accuracy of the lane keeping control is reduced due to the existence of the branch point 205, through the HMI 7. Further, in a case where a determination that the branch point 205 exists is made by the determination unit 11 and a case where an instruction to advance the vehicle V to a branch lane is given to the HMI 7 or the like by a driver of the vehicle V, the lane keeping control unit 12 may perform the lane keeping control such that the vehicle V travels along the branch lane.

On the other hand, in a case where a determination that the branch point 205 from the driving lane 200 does not exist in front of the vehicle V is made by the determination unit 11, the lane keeping control unit 12 performs the lane keeping control such that the vehicle V travels to be spaced by an equal distance from both of the two lane lines 202 and 203, for example.

In this embodiment, in a case where the existence of the branch point 205 in front of the vehicle V is not recognized based on the position information of the vehicle V and the map information, when the lane width variation is greater than or equal to the first threshold value larger than the second threshold value, a determination that the branch point 205 exists is made by the determination unit 11 of the vehicle control device 100. Therefore, it is possible to prevent the existence of the branch point 205 from being erroneously determined due to a small variation in the distance between the two lane lines 202 and 203 though the possibility that the branch point 205 may exist in reality is low. On the other hand, in a case where the existence of the branch point 205 in front of the vehicle V is recognized based on the position information of the vehicle V and the map information, when the lane width variation is greater than or equal to the second threshold value smaller than the first threshold value, a determination that the branch point 205 exists is made by the determination unit 11. Therefore, in a case where the possibility that the branch point 205 may exist in reality is high, a determination that the branch point 205 exists in front of the vehicle V is made earlier, and therefore, it is possible to prevent the behavior of the vehicle V from becoming unstable, such as the vehicle V wobbling. From the above, it is possible to improve the accuracy of a determination of whether or not the branch point 205 from the driving lane 200 exists in front of the vehicle V, and thus reduce the behavior of the vehicle V becoming unstable.

Further, in a case where the lane width reference value which is a reference value of the distance between the two lane lines 202 and 203 is acquired based on the position information of the vehicle V and the map information by the determination unit 11 and the lane width variation is calculated based on the amount of change of the distance between the two lane lines 202 and 203 recognized based on the captured image 301 with respect to the lane width reference value, it is possible to reduce the influence of an error or the like of the recognition of the lane lines 202 and 203 in the captured image 301, and thus it is possible to improve the accuracy of the calculation of the lane width variation.

An embodiment of the present invention has been described above. However, the present invention can be implemented in various forms without being limited to the above-described embodiment.

What is claimed is:

1. A vehicle control device comprising:
a determination unit configured to recognize two lane lines which define a driving lane of a vehicle, based on a captured image of in front of the vehicle, and determine whether or not a branch point from the driving lane exists in front of the vehicle, based on a lane width variation which is the amount of change of a distance between the two lane lines; and
a lane keeping control unit configured to perform lane keeping control such that the vehicle travels along the driving lane, based on a result determined by the determination unit,
wherein the determination unit is configured to,
in a case where existence of the branch point in front of the vehicle is not recognized based on position information of the vehicle and map information, determine that the branch point exists, when the lane width variation is greater than or equal to a first threshold value, and,
in a case where existence of the branch point in front of the vehicle is recognized based on the position information of the vehicle and the map information, determine that the branch point exists, when the lane width variation is greater than or equal to a second threshold value smaller than the first threshold value.

2. The vehicle control device according to claim 1, wherein the determination unit is configured to acquire a lane width reference value which is a reference value of the distance between the two lane lines, based on the position information of the vehicle and the map information, and calculate the lane width variation, based on the amount of change of the distance between the two lane lines recognized based on the captured image of in front of the vehicle with respect to the lane width reference value.

* * * * *